(No Model.)
J. S. GLENN.
METALLIC RING PACKING.
No. 465,573. Patented Dec. 22, 1891.
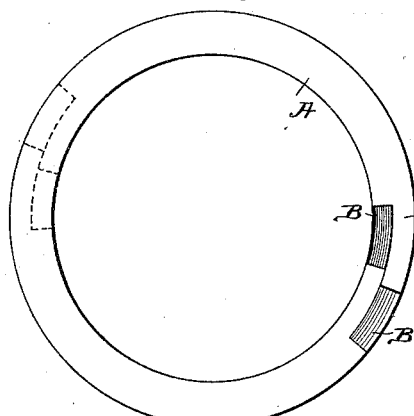
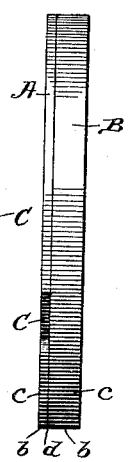
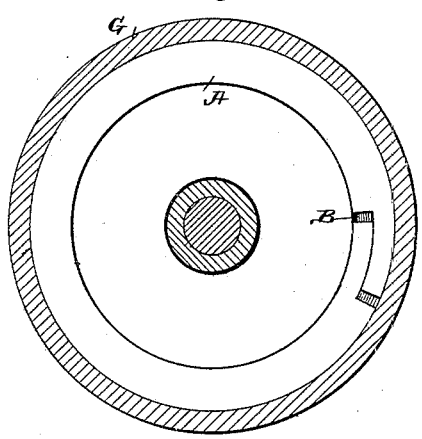
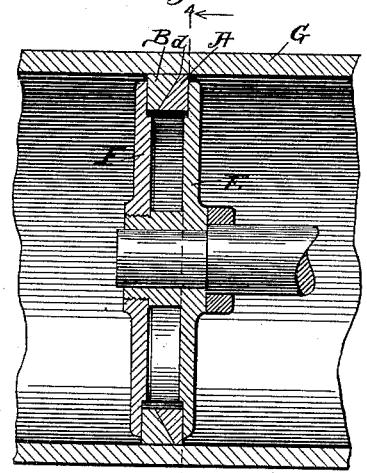
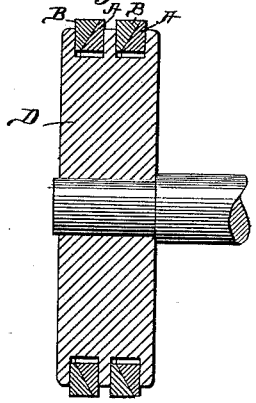
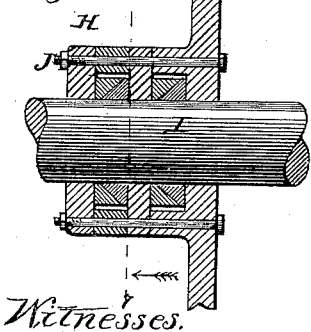
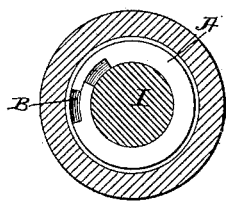
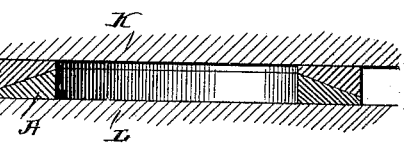
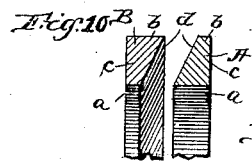
Witnesses.
Wm. M. Rheem
James R. Scath
Inventor,
John S. Glenn
By Elliott & Cushing, atty's.

UNITED STATES PATENT OFFICE.

JOHN S. GLENN, OF CHICAGO, ILLINOIS.

METALLIC RING PACKING.

SPECIFICATION forming part of Letters Patent No. 465,573, dated December 22, 1891.

Application filed March 28, 1891. Serial No. 386,775. (No model.)

*To all whom it may concern:*

Be it known that I, JOHN S. GLENN, a citizen of the United States, residing in the city of Chicago, in the county of Cook and State of Illinois, have invented certain new and useful Improvements in Metallic Ring Packings, of which the following is a specification.

This invention relates to improvements in that class of metallic ring packings for pistons, piston-rods, &c., for producing steam-tight joints, in which the rings are split or sectional and have their meeting faces correspondingly beveled or inclined.

Prior to this invention no packing of this class designed for use in connection with a piston could be transferred to and used for packing a piston-rod without changing the construction and operation thereof, nor can one designed for packing either a piston or piston-rod be employed in connection with a slide-valve or a similar flat surface, or vice versa. Besides which all of the prior forms of ring packings required the employment, in connection therewith, of special forms of devices—such as screws, springs, and wedges—for rendering the rings operative as a packing, all of which devices are more or less complicated and expensive and require constant adjustment to take up the wear of the parts.

The prime object of this invention is to have a ring packing capable of use in connection with either a piston, a piston-rod, or valve-stem, a slide-valve, or other devices of a similar nature without change of form, construction, or operation, and which will pack equally well an internal or an external surface or between flat surfaces.

Another object is to have a ring packing of such character that two or more rings alone constitute a complete packing without the employment of screws, springs, or other kinds of devices for rendering them operative, which require no nicety of fitting or adjustment, and which are self-adjusting when in their operative position, so as to automatically take up the wear, whereby when once placed in position they serve to provide a permanent steam-tight packing in whatever use they may be put to, and finally to have the packing-rings of such character that they will expand for self-adjustment in a diametrical as well as a lateral direction, whereby they will not only provide a steam-tight joint between the parts to which they are applied, but also as between themselves and between themselves and the surfaces by which they are supported, and this, too, notwithstanding the automatic adjustment of the rings to take up the wear thereof.

These objects are attained by the devices illustrated in the accompanying drawings, in which—

Figure 1 represents a face view of a pair of packing-rings embodying my invention; Fig. 2, a side elevation thereof; Fig. 3, a detail sectional view showing the application of my invention to a piston; Fig. 4, a transverse vertical section on the line 4 4 of Fig. 3, looking in the direction indicated by the arrows; Fig. 5, a detail section of a piston, showing a duplication of the ring packing; Fig. 6, a detail section showing the application of my packing to a piston-rod or valve-stem; Fig. 7, a transverse vertical section on the line 7 7 of Fig. 6, looking in the direction indicated by the arrows; Fig. 8, a detail section showing the application of my packing to a slide-valve or other flat surface; Fig. 9, a central section of a modified form of the packing, showing three rings instead of a pair, as in the preferred construction, as illustrated in the other views; Fig. 10, an enlarged detail cross-section through the packing-rings, showing them slightly separated.

Similar letters of reference indicate the same parts in the several figures of the drawings.

Referring by letter to the accompanying drawings, A B indicate a pair of packing-rings composed of spring metal, each of which is cut through or provided with a lap-joint C to permit the contraction or expansion of the rings, the joint in one ring breaking with the solid portion of the other ring, so as to avoid the possibility of the direct passage of the steam through this joint. As clearly shown in the drawings, the lap-joint is formed by cutting such ring transversely partly through at two different points on opposite sides and then connecting these transverse cuts together by another cut running parallel with the peripheries of the rings. Thus it will be seen that the expansion or contraction of the rings will never cause the members of the joint to separate, but the parts may always be maintained in contact without decreasing or increasing the diameter of the rings. Both peripheries of the rings throughout their whole extent from the transverse cuts which sever them are regular and circular, the single transverse cut in each periphery being the only point at which the continuity of such periphery is broken, so that when the rings are placed together a ring-shaped packing is produced, which has a regular circular steam-tight bearing-surface throughout the whole extent of its inner as well as its outer periphery, which, when the packing is placed over a piston-rod, will prevent the passage of steam between such rod and the rings.

The inner and outer peripheries $a$ $b$ of the rings are parallel with the axis thereof, and the outer faces $c$ are at a right angle or secured to the axes, while the inner meeting faces $d$ are oblique to the axes, so that when the rings are put together they form in cross-section a parallelogram composed of two wedge-shaped bodies inverted as to each other—that is to say, the outer periphery $b$ of the ring A is much less than that of the ring B, while on the contrary the inner periphery $a$ of the ring B is correspondingly smaller than the inner periphery of the ring A. The purpose and object of this construction is to provide the rings with unequal bearing and consequently unequal wearing-surfaces, so that whether used for packing a piston or a piston-rod the smaller bearing-surface will wear more rapidly than the larger bearing-surface, and hence the ring having the lesser bearing-surface exposed to wear will be permitted to expand or contract more rapidly than the other ring, and thus, by the wedge-like action of the rings upon each other, will cause a lateral movement of the rings, which will take up all play between the rings and the side walls of their bearing-sockets, thereby providing a self-adjusting packing that will automatically compensate for wear in all directions. These rings alone constitute a complete packing without the employment in connection therewith of screws, springs, or any other form of actuating devices, such as have heretofore invariably been essential to the successful operation of packing-rings having the form of my rings, and they are adapted for packing interior, exterior, or flat surfaces without any change whatever in form, it being only necessary to transfer them from one bearing-socket to another. For instance, as illustrated in Figs. 3, 4, and 5 of the drawings, showing the application of the rings to the packing of a piston, the piston is simply provided with a peripheral groove or seat of substantially the width of the two rings when put together, which groove or seat may be formed in a solid piston D, as illustrated in Fig 5, or the piston E may be provided with a removable follower F, as illustrated in Fig. 3, for convenience of inserting the rings in position.

In this kind of a packing both rings have the expansile or outward tension and are contracted or sprung to a small circle when inserted in the cylinder or piston-chamber G, so that the expansive force of the rings will cause them to make and maintain a steam-tight joint with the walls of the cylinder or chamber, and automatically take up any wear which may result from use.

As before described, by reason of the difference in the bearing-surfaces of the two rings exposed to the cylinder the rings when in use will wear unequally and will expand unequally—that is to say, the ring A will wear more rapidly when the packing is applied to a piston—and will of course expand correspondingly to make up for such wear, and this unequal expansion is also the effect of producing a lateral pressure as between the two rings by reason of their incline or oblique meeting faces, which causes the rings to operate as wedges, and thus force the outer faces $c$ of the rings tightly against the side walls of the groove in the piston, so as to make a steam-tight joint, not only as between the rings themselves, but as between the rings and the piston. It will thus be seen that the rings exert both a diametrical and lateral pressure which continues at all times and makes a steam-tight joint and takes up wear in all directions.

When the packing is applied to a piston-rod, valve-stem, or the like exterior surface, its operation and the result thereof are exactly the same as when applied to a piston, excepting that in this case the rings are held stationary in the stuffing-box H, through which the piston-rod or valve-stem I works, the box being provided with annular grooves J, in which the rings are seated, and in connection with which they operate the same as with the peripheral groove of the piston. One other and important point of difference, however, is that the rings in packing a piston-rod or exterior surface both have a contractile or inward tension, so that the inner peripheries instead of the outer peripheries become the bearing and wearing surfaces; but in other respects the operation of the packing is identical with that previously described, and if the size of the piston-rod be the same as that of the piston which it is desired to pack the rings used for packing the piston may be transferred to and used for packing the piston-rod without any change whatever.

The same packing-rings taken from either a piston or a piston-rod may be transferred to and used for packing between two flat surfaces, such as illustrated in Fig. 8, for forming a steam-tight-joint—such, for example, as upon a slide-valve for counterbalancing the same—the parts K illustrating the end face of the steam-chest cover and the part L the top of the slide-valve, or vice versa. In this case, however, one of the rings—say the upper ring B—will have an inward or contractile tension, while the lower ring A will have an outward or expansile tension, the purpose being to produce a lateral pressure of the rings against the parts K and L, and the meeting inclined faces of the rings under this opposite or opposing tension will produce the desired result.

While for all classes of work I prefer simply a pair of rings only, duplicated side by side, as in Fig. 5, where it may be found desirable under heavy pressures, at the same time I do not desire to limit myself to a single pair of rings or to two or more pair working separately, for they may as well be placed side by side to any desirable extent, and produce substantially the same results; or, as illustrated in Fig. 9, a very good form of packing may be formed of three rings, the middle ring having oppositely-inclined outer faces and the end rings correspondingly-inclined inner faces, so that in packing either an exterior or an interior surface, as the case may be, the middle ring will have the lesser bearing-surface in one case and the end rings the lesser bearing-surfaces in the other case, these packing-rings being also adaptable for packing between flat surfaces. It will therefore be understood that the essential feature of my invention is a packing composed of two or more spring metallic rings, the inner meeting faces of which are oblique to the axis of the rings and to the outer faces thereof, whereby the rings present unequal bearing-surfaces on their inner and outer peripheries, such packing being applicable to the packing of interior or exterior cylindrical or flat surfaces without any change whatever in the form or operation of the rings, which are interchangeable in their uses, and which constitute complete and perfect packings without the necessity for employing in connection therewith screws, springs, or other forms of devices to render the rings operative as packings, as has heretofore invariably been necessary with packing-rings having the general contour of my rings.

I am well aware that it is old to form a packing of a number of curved sections held together by pin-and-slot connection in the form of two rings having their meeting faces inclined on an angle oblique to the axis of the packing, and the rings thus formed being situated between two annular plates or flat rings held asunder by a collar or hub, upon which said rings are sleeved, and between which hub and the rings is interposed a spiral spring for holding the sections of the rings outward; and I am also aware that it is old to form a packing of two divided spring-rings, each beveled on both sides toward its inner periphery, which is serrated or notched in the direction of its axis, arranged axially with a third ring interposed between them, the latter being beveled toward its outer periphery, so as to be complementary to and expand the other rings; but neither of these constructions is the equivalent of my invention; nor do I wish to claim the same.

Having described my invention, what I claim, and desire to secure by Letters Patent, is—

1. A metallic packing consisting of a number of spring-rings of equal dimensions and equal transverse areas, said rings being formed with inclined meeting faces oblique to the axis of the ring, so as to present unequal internal and external peripheral bearing-surfaces, and each ring being divided at one place only and there provided with a lap-joint, so that the rings will coact upon each other, and thereby produce a diametrical and lateral pressure in both directions, substantially as and for the purpose described.

2. A metallic packing composed entirely of two or more integral spring-rings, the meeting inner faces of which are in actual contact with each other and arranged at an angle or oblique to the axis of the rings and to the outer faces thereof, said outer faces being parallel and perpendicular to the axis of the rings and confined between and bearing against fixed walls or supports, substantially as described.

3. A metallic packing consisting of two or more integral spring-rings, each of which is provided with a lap-joint cut parallel with the peripheries of the rings, and the inner faces of which rings are at an angle or oblique to the axis of the rings and to the outer faces thereof, and the inner and outer peripheries of which rings present unequal bearing-surfaces, substantially as set forth.

4. A metallic packing consisting of a number of spring-rings of equal dimensions and equal transverse areas, said rings being formed with inclined meeting faces oblique to the axis of the ring, so as to present unequal internal and external peripheral bearing-surfaces, and each ring being made integral and provided with a lap-joint cut parallel with the peripheries of the rings, so that the rings will coact with each other, and thereby produce a diametrical and lateral pressure in both directions, substantially as and for the purpose set forth.

5. A metallic packing consisting of two or more spring-rings having their meeting faces in actual contact with each other and being inclined at an angle oblique to the axis of the rings, each ring being formed integral and cut transversely partly through on opposite sides at two different points and said transverse cuts being connected by a third cut running parallel with the peripheries of the ring, the inner, as well as the outer, the periphery of each ring having a regular circular steam-tight bearing-surface throughout its extent on both sides of its said transverse cut, substantially as and for the purposes set forth.

JOHN S. GLENN.

Witnesses:
R. C. OMOHUNDRO,
JAMES R. SCOTT.